United States Patent
Lee

(10) Patent No.: US 6,295,297 B1
(45) Date of Patent: Sep. 25, 2001

(54) GATEWAY FOR CONNECTING ATM-BASED ACCESS NETWORK TO EXISTING NETWORK

(75) Inventor: Hae-yeong Lee, Kunpo (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/098,416

(22) Filed: Jun. 16, 1998

(30) Foreign Application Priority Data

Dec. 29, 1997 (KR) .................................................. 97-76405

(51) Int. Cl.[7] .................................................... H04L 12/56
(52) U.S. Cl. .......................... 370/395; 370/401; 370/409; 370/466
(58) Field of Search ..................................... 370/355, 356, 370/352, 395, 401, 466, 467, 409, 359, 419, 420, 463, 474, 475, 421

(56) References Cited

U.S. PATENT DOCUMENTS

| | | | |
|---|---|---|---|
| 5,408,469 | * 4/1995 | Opher et al. | 370/399 |
| 5,526,351 | * 6/1996 | Mochinaga et al. | 370/401 |
| 5,568,471 | 10/1996 | Hershey et al. | 370/17 |
| 5,734,656 | * 3/1998 | Prince et al. | 370/401 |
| 5,781,549 | * 7/1998 | Dai | 370/401 |
| 5,949,775 | * 9/1999 | Rautiola et al. | 370/401 |

FOREIGN PATENT DOCUMENTS

| | | | |
|---|---|---|---|
| 0 666 670 | 8/1995 | (EP) | H04L/29/06 |
| 0 705 012 | 4/1996 | (EP) | H04L/29/00 |
| 0 822 731 | 2/1998 | (EP) | H04Q/11/04 |
| 2 294 840 | 5/1996 | (GB) | H04Q/3/00 |
| 2-288749 | 11/1990 | (JP) | H04L/12/48 |
| 7-15461 | 1/1995 | (JP) | H04L/12/48 |
| 1998-047015 | 9/1998 | (KR) | H04L/12/56 |

OTHER PUBLICATIONS

"ATM Switching in the Developing Telecommunication Network", Schaffer, International Switching Symposium (May 28–Jun. 1, 1990) Session A2 Paper #3 Proceedings vol. I pp. 105–110.
"Pacemaker For Broadband Communications" International Telecom Report 14(1991) No. 5, pp. 26–29.

* cited by examiner

Primary Examiner—Ricky Ngo
Assistant Examiner—Phuc Tran
(74) Attorney, Agent, or Firm—Sughrue, Mion, Zinn, Macpeak & Seas, PLLC

(57) ABSTRACT

A gateway for connecting an existing public network to an asynchronous transfer mode (ATM)-based access network is provided. The gateway includes an ATM network connector for performing signal processing to send or receive a signal via a broadband ATM network and controlling the signal processing, an existing circuit network connector for processing a signal to send or receive the signal via an existing circuit network, reciprocally converting between the signal transmitted via the existing circuit network and an ATM cell, and controlling the signal processing and the conversion, a plurality of line terminations for sending or receiving a signal by connecting to a remote user, converting between the signal from the user and the ATM cell, and controlling the sending, reception and conversion, and a system bus for transmitting a signal between the plurality of line terminations and the ATM and existing circuit network connectors. Therefore, when a superspeed information communications network is later established on the basis of ATM, the load applied to an ATM network exchanger during connection of an ATM access network with the existing circuit network is reduced, to aid high-speed information communications.

3 Claims, 3 Drawing Sheets

GATEWAY FOR CONNECTING ATM-BASED ACCESS NETWORK TO EXISTING NETWORK

BACKGROUND OF THE INVENTION

1. Field of the Invention

The present invention relates to a gateway between networks each using a different communications protocol, and more particularly, to a gateway for connecting an asynchronous transfer mode (ATM)-based access network to an existing circuit public network.

2. Description of the Related Art

The Internet is providing an ever-increasing variety of useful information communication services. However, communication networks have been developing relatively slowly, so that access to the information services has been provided less quickly than expected. In order to solve this problem, establishment of an access network and a high-speed basic network are urgently required. Fortunately, high-speed information communication will be realized sooner or later because of technical developments related to digital subscriber line (hereinafter, called xDSL) technology, cable modems, high-speed wireless networks, satellites, etc. In the term xDSL, when x is A, the A denotes "asymmetric", and when x is V, the V denotes "very high speed".

However, a connection between this high-speed basic network or access network and an existing network (e.g., an existing packet network, a PSTN, an ISDN, etc.) has not yet been sufficiently studied.

Referring to FIG. 1, a connection of a conventional ATM network 100 to an existing circuit network 110 is performed in an ATM network exchanger. That is, the ATM network exchanger converts a protocol between networks using a specially-installed gateway, so that the ATM network 100 is connected to an existing packet network. Also, internally or externally installed in the ATM network exchanger is a device for emulating a circuit using an ATM adaptive layer (AAL-1) to connect the ATM network 100 to the existing circuit network 110. In FIG. 1, NSP denotes a network service provider, LT denotes line termination, NT denotes network termination, UNI denotes a user network interface, and ANI denotes an access network interface.

The above-described conventional connection is suitable when the number of subscribers connected to the ATM network is small. However, an increase in the number of subscribers due to the spread of the access network in the near future may overload protocol conversion to be made by a gateway unit. Also, when all the existing telephone network subscribers connect at once to the circuit network via the ATM network, the ATM network exchanger is overloaded, which makes highspeed information communications impossible.

SUMMARY OF THE INVENTION

To solve the above problems, it is an objective of the present invention to provide a gateway for connecting an ATM-based access network to an existing circuit network, to aid high-speed information communications by reducing the load applied to an ATM network exchanger during connection of the ATM network to the existing network, when a superspeed information communication network is constructed on the basis of ATM in the future.

Accordingly, to achieve the above objective, there is provided a gateway for connecting an existing circuit network to an asynchronous transfer mode (ATM)-based access network which connects a subscriber and a basic network, comprising: an ATM network connector for performing signal processing to send or receive a signal via a broadband ATM network and controlling the signal processing; an existing circuit network connector for processing a signal to send or receive the signal via an existing circuit network, reciprocally converting between the signal transmitted via the existing circuit network and an ATM cell, and controlling the signal processing and the conversion; a plurality of line terminations for sending or receiving a signal by connecting to a remote user, converting between the signal from the user and the ATM cell, and controlling the sending, reception and conversion; and a system bus for transmitting a signal between the plurality of line terminations and the ATM and existing circuit network connectors.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Hereinafter, an existing circuit network denotes a circuit public network such as an existing integrated services digital network (ISDN) and an existing public switched telephone network (PSTN).

Figure 1:
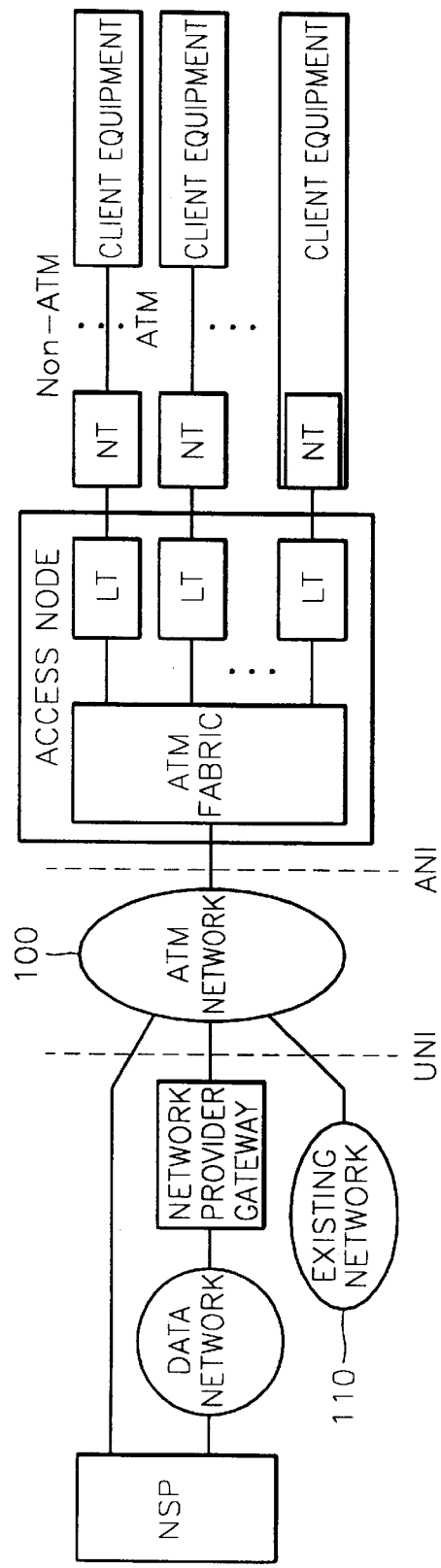
FIG. 1 is a block diagram illustrating a conventional method of connecting an existing circuit network to an asynchronous transfer mode (ATM) network.
Figure 2:
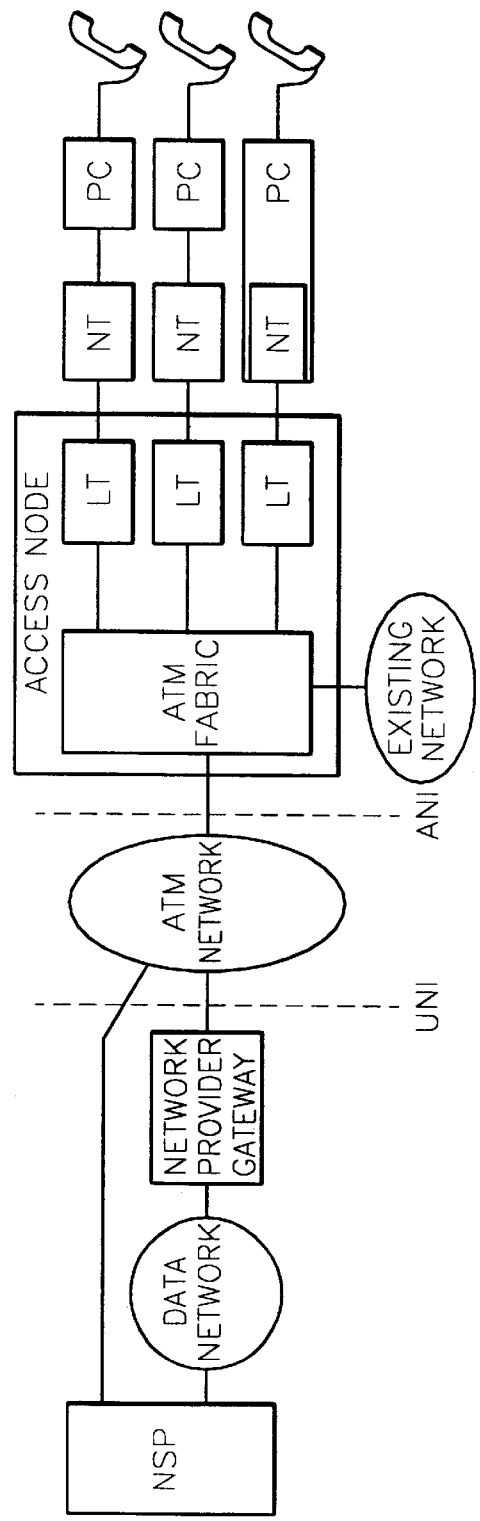
FIG. 2 is a block diagram illustrating another method of connecting an existing circuit network to an ATM access network.

FIG. 2 shows a connection of an asynchronous transfer mode (ATM)-based access network to an existing public network such as an ISDN or PSTN.

For this, an ATM fabric in an access node of FIG. 2 must perform a routing function of distributing information received from each line termination (hereinafter, called LT) to an ATM basic network and an existing circuit network, according to the cell type of the information. However, in general, the ATM fabric cannot perform the routing function, so that a gateway according to the present invention shown in FIG. 3 is proposed.

Figure 3:
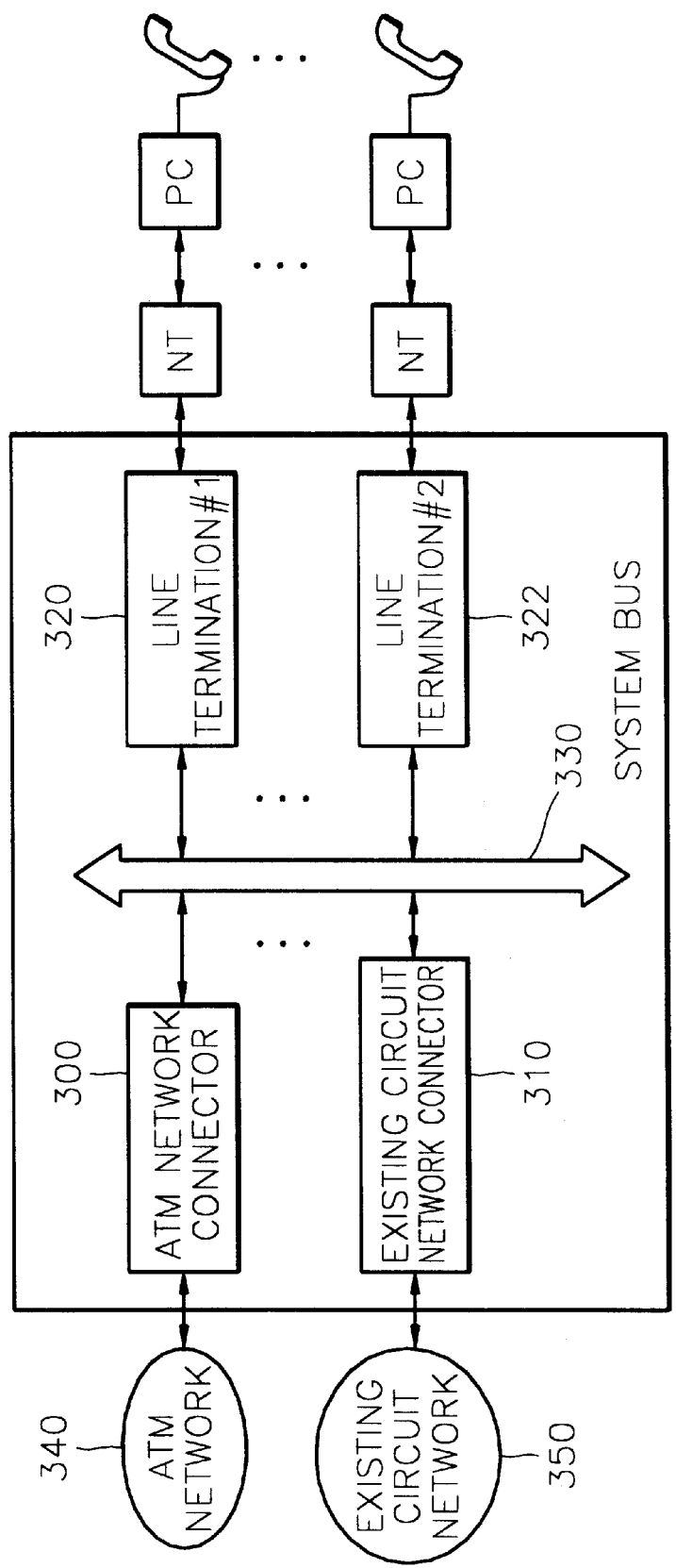
FIG. 3 is a block diagram illustrating the configuration of a gateway according to the present invention for performing the method of FIG. 2.

Referring to FIG. 3, a gateway for connecting an existing circuit network 350 to an ATM access network for connection between a subscriber and a basic network, according to the present invention, includes an ATM network connector 300, an existing circuit network connector 310, a plurality of line terminations 320 and 322 and a system bus 330.

The ATM network connector 300 performs signal processing to transmit or receive a signal via a broadband ATM network 340, and controls the signal processing.

The existing circuit network connector 310 performs signal processing to send or receive a signal via the existing circuit network 350, converts between the signal input via the existing circuit network and an ATM cell, and controls the signal processing and the conversion.

The plurality of line terminations 320 and 322 sends or receives a signal by connecting to remote users, converts between the signal from the user and the ATM cell, and controls the sending, reception and conversion.

The system bus 330 is a path for signal transmission between the line terminations 320 and 322, the ATM network connector 300, and the existing circuit network connector 310.

Figure 4:
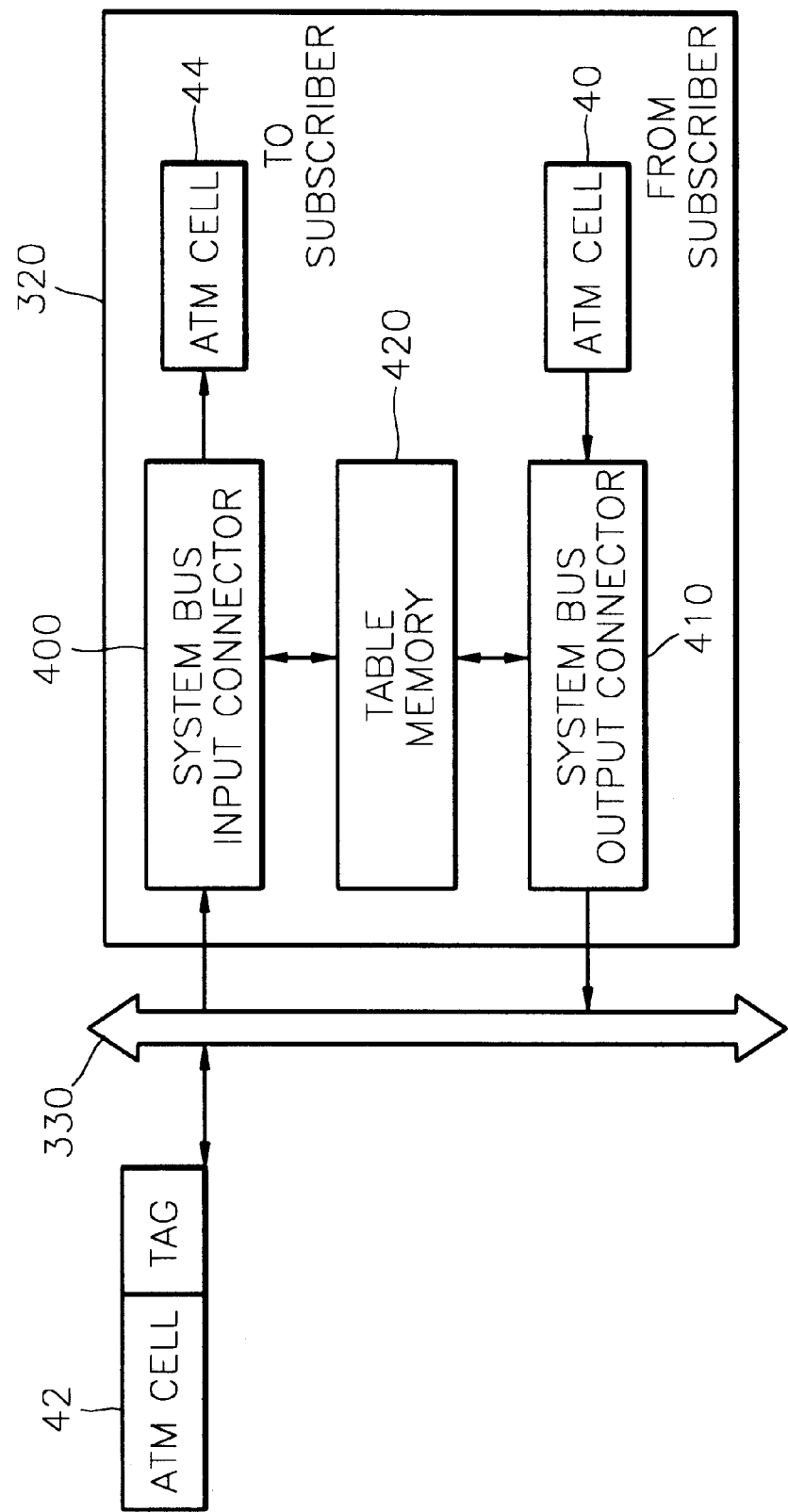
FIG. 4 is a block diagram illustrating the configuration of a line termination of FIG. 3.

Referring to FIG. 4, the plurality of line terminations 320 and 322 each include system bus input and output connectors 400 and 410 for connecting to the system bus 330, and a table memory 420 for storing routing information. The ATM network connector 300 and the existing circuit network 310 each also include the system bus input and output connectors and the table memory.

Routing methods in the gateway according to the present invention will now be described.

The first method is to allocate a permanent virtual circuit (PVC) channel with respect to a service (e.g., a telephone) using the existing circuit network 350. That is, a PVC channel is allocated to each of the LTs 320 and 322, another PVC channel is allocated for a signal indication protocol (e.g., Q.931) of the existing circuit network 350 used by both the LTs 320 and 322, and a switched virtual circuit (SVC) channel is adopted for communications using the ATM network 340. Accordingly, virtual path identifier/virtual channel identifier (VPI/VCI) information of an ATM header determines which network is to be used by every ATM cell passed through the access node out of the ATM network 340 and the existing circuit network 350.

To be more specific, first, the flow of the ATM cells into the ATM network connector 300 and the existing circuit network connector 310 from the LTs 320 and 322 is as follows. The LTs 320 and 322 obtain information indicating whether a channel for the ATM cell 40 received from a subscriber is the PVC channel allocated to the existing circuit network service, and information on the port numbers of the LTs 320 and 322, using a table preset with respect to the ATM cell 40, and attaches a tag containing this information to the front of the ATM cell 40. When the LTs 320 and 322 send an ATM cell 42 with the tag to the system bus 330, the ATM network connector 300 and the existing circuit network connector 310 can each select the ATM cells 42 transmitted to them.

Meanwhile, the flow of ATM cells from the ATM and existing circuit network connectors 300 and 310 to the LTs 320 and 322 is similar to that described above. That is, the ATM and existing circuit network connectors 300 and 310 obtain tag information corresponding to the LTs 320 and 322 using a table preset-according to the VPI/VCI information, and attach the tag information to the front of the ATM cell to send the result to the system bus 330. Then, each of the LTs 320 and 322 reads the ATM cell 44 consistent with a tag number allocated to itself and stores the result in its internal buffer.

The second routing method is to allocate also the SVC channel to a service using the existing circuit network 350. That is, when each LT signals to initiate a service, a generic flow control (GFC) value of the ATM cell is used to determine whether the service is a service using the ATM network 340 or a service using the existing circuit network 350.

originally, the GFC value is set to be used in the future to control the flow of data between a regional exchanger and a subscriber, but the field of its usage has not yet been defined. In the present invention, this value is used to control the flow of the ATM cells to the ATM and existing circuit network connectors 300 and 310. That is, with respect to the information using the ATM network connector 300, "0000" is allocated to the GFC value as usual. With respect to the information using the existing circuit network connector 310, a predetermined value other than "0000" is allocated to the GFC value. Therefore, according to the GFC information of the ATM header and the VPI/VCI information, it is determined which network is to be used by every cell passed through the access node from the ATM and existing circuit networks 340 and 350.

To be more specific, the flow of the ATM cells from the LTs 320 and 322 to the ATM and existing circuit network connectors 300 and 310 is as follows. First, the LTs 320 and 322 obtain GFC information and information on the port numbers of the LTs 320 and 322, using a table preset with respect to the ATM cell 40 received from a subscriber, and attach a tag containing this information to the front of the ATM cell 40. When the LTs 320 and 322 send the ATM cell 42 with a tag to the system bus 330, the ATM and existing circuit network connectors 300 and 310 can each select the ATM sell 42 transmitted to themselves.

Meanwhile, the flow of the ATM cells from the ATM and existing circuit network connectors 300 and 310 to the LTs 320 and 322 is similar to that described above. That is, the ATM and existing circuit network connectors 300 and 310 obtain tag information corresponding to the LTs 320 and 322 using a table preset according to the VPI/VCI information, and attach the tag information to the front of the ATM cell to send the result to the system bus 330. Then, each of the LTs 320 and 322 reads the ATM cell 44 consistent with a tag number allocated to itself and stores the result in its internal buffer.

According to the present invention, when a superspeed information communication network is realized on the basis of the ATM in the future, the load applied to an ATM network exchanger during connection of the ATM access network to an existing network is reduced, to thus aid high-speed information communications.

While only certain embodiments of the invention have been specifically described herein, it will apparent that numerous modifications may be made thereto without departing from the spirit and scope of the invention.

What is claimed is:

1. A gateway for connecting an existing circuit network to an asynchronous transfer mode (ATM)-based access network which connects a subscriber and a basic network, comprising:

an ATM network connector for performing first signal processing to send or receive a first signal via a broadband ATM network and controlling the first signal processing;

an existing circuit network connector for performing a second signal processing to send or receive a second signal via an existing circuit network, reciprocally converting between the second signal transmitted via the existing circuit network and an ATM cell, and controlling the second signal processing and the reciprocal conversion; and a plurality of line terminations for sending to a remote user at least one of said first signal and said second signal or receiving from the remote user the at least one of said first signal and said second signal by connecting to the remote user, converting between the at least one of said first signal and said second signal sent to or received from the remote user and the ATM cell, and controlling the sending, receiving and conversion of the at least one of said first signal and said second signal with respect to the remote user, the plurality of line terminations having memory which stores a first table preset according to virtual path identifier/virtual channel identifier (VPI/VCI) information for providing first tag information corresponding to the line termination, where the first tag information is attached to the front of the ATM cell to send a result to a system bus, and a second table preset with respect to the ATM cell received from the subscriber for providing second tag information on the port numbers of the line terminations and on generic flow control (GFC), where the second tag information is attached to the front of the ATM cell to send a result to the system bus;

the system bus for transmitting the at least one of said first signal and said second signal between said plurality of line terminations and said ATM network connector and said existing circuit network connector.

2. The gateway for connecting an existing circuit network to an asynchronous transfer mode (ATM)-based access network as claimed in claim 1, wherein the line terminations comprise a common PVC channel for signaling, and control routing of a signal heading for the ATM and existing circuit network connectors, and each line termination comprises a separate PVC channel for connecting to the existing circuit network connector.

3. The gateway for connecting an existing circuit network to an asynchronous transfer mode (ATM)-based access as claimed in claim 1, wherein each of the line terminations controls the routing of a signal heading for the ATM and existing circuit network connectors, according to a value allocated to a generic flow control (GFC) value of the ATM cell.

* * * * *